(12) United States Patent
Kwon et al.

(10) Patent No.: US 12,475,785 B2
(45) Date of Patent: Nov. 18, 2025

(54) TRAFFIC CONTROL METHOD AND APPARATUS WITH AUTONOMOUS VEHICLE BASED ON ADAPTIVE REWARD

(71) Applicant: FOUNDATION OF SOONGSIL UNIVERSITY-INDUSTRY COOPERATION, Seoul (KR)

(72) Inventors: Min Hae Kwon, Seoul (KR); Chan In Eom, Seoul (KR); Dong Su Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 106 days.

(21) Appl. No.: 18/404,077

(22) Filed: Jan. 4, 2024

(65) Prior Publication Data
US 2025/0095487 A1 Mar. 20, 2025

(30) Foreign Application Priority Data
Sep. 15, 2023 (KR) .................. 10-2023-0122932

(51) Int. Cl.
*B60W 60/00* (2020.01)
*B60W 30/14* (2006.01)
(Continued)

(52) U.S. Cl.
CPC ..... *G08G 1/096725* (2013.01); *B60W 30/143* (2013.01); *B60W 60/001* (2020.02);
(Continued)

(58) Field of Classification Search
CPC ...... B60W 10/04; B60W 10/18; B60W 10/20; B60W 30/085; B60W 30/09;
(Continued)

(56) References Cited

U.S. PATENT DOCUMENTS 10,739,776 B2 * 8/2020 Mukadam ........... B60W 30/085
2019/0113929 A1 * 4/2019 Mukadam .............. G08G 1/167
(Continued)

FOREIGN PATENT DOCUMENTS

KR 10-2020-0071406 A 6/2020
KR 10-2022-0102395 A 7/2022

*Primary Examiner* — Peter D Nolan
*Assistant Examiner* — Ce Li Li
(74) *Attorney, Agent, or Firm* — Stein IP LLC

(57) ABSTRACT

A traffic control method and apparatus with an autonomous vehicle based on adaptive reward. A traffic control apparatus for an autonomous vehicle based on adaptive reward comprises an information observation unit that collects observation information from a sensing module of an autonomous vehicle or a roadside unit (RSU); a policy execution unit that decides on an action including adjusting acceleration and changing lanes of the autonomous vehicle based on the observation information and policy; and a reward determination unit that determines reward according to observation information at a next timestep according to the decision made, wherein reward in the reward determination unit includes penalty in an event of an accident and reward when driving, wherein the reward when driving includes an adaptive target speed reward term, a successful lane change reward term, and a safety distance compliance reward term that are adaptively determined according to road traffic.

9 Claims, 10 Drawing Sheets

(a) Successful lane change (b) Meaningless lane change

(51) Int. Cl.
  *G08G 1/01* (2006.01)
  *G08G 1/0967* (2006.01)
(52) U.S. Cl.
  CPC ..... *G08G 1/0125* (2013.01); *G08G 1/096775* (2013.01); *B60W 2554/802* (2020.02); *B60W 2720/103* (2013.01)
(58) Field of Classification Search
  CPC ........... B60W 30/095; B60W 30/0956; B60W 30/143; B60W 30/18163; B60W 60/001; B60W 60/0016; B60W 60/00276; B60W 2400/00; B60W 2420/403; B60W 2420/408; B60W 2520/10; B60W 2552/50; B60W 2552/53; B60W 2554/00; B60W 2554/20; B60W 2554/4029; B60W 2554/4046; B60W 2554/60; B60W 2554/801; B60W 2554/802; B60W 2554/804; B60W 2555/60; B60W 2710/18; B60W 2720/103; G05D 1/0088; G05D 1/0221; G05D 1/0246; G08G 1/0112; G08G 1/0125; G08G 1/0145; G08G 1/096725; G08G 1/096775; G08G 1/166; G08G 1/167
  See application file for complete search history.

(56) References Cited

U.S. PATENT DOCUMENTS

| | | | |
|---|---|---|---|
| 2019/0291727 A1* | 9/2019 | Shalev-Shwartz | ............................ G01C 21/3602 |
| 2022/0219695 A1* | 7/2022 | Satti | ....................... B60W 40/09 |

* cited by examiner (a) Successful lane change   (b) Meaningless lane change

TRAFFIC CONTROL METHOD AND APPARATUS WITH AUTONOMOUS VEHICLE BASED ON ADAPTIVE REWARD

CROSS-REFERENCE TO RELATED APPLICATIONS

This application claims the benefit of Korean Application No. 10-2023-0122932, filed Sep. 15, 2023, in the Korean Intellectual Property Office. All 10 disclosures of the document named above are incorporated herein by reference.

TECHNICAL FIELD

The present invention relates to a traffic control method and apparatus with an autonomous vehicle based on adaptive reward.

BACKGROUND ART

Traffic congestion is a factor that greatly decreases road stability and increases accident risk. Accordingly, technology research is being actively conducted to control traffic congestion through the control of autonomous vehicles.

Korean Patent Application Publication No. 10-2020-0071406 (Title of the Invention: Intersection traffic control system of autonomous vehicle and intersection traffic control method using it) collects information of autonomous vehicles stopped to enter the intersection and signal information, and controls traffic by determining the order in which autonomous vehicles enter the intersection.

This only determines the order of entering the intersection and does not directly control individual autonomous vehicles.

Korean Patent Application Publication No. 10-2022-0102395 (Apparatus and method for improving advanced deep reinforcement learning based traffic in non-signalized intersections for the multiple self-driving vehicles) performs platooning through control of autonomous vehicles. Further, traffic is improved at non-signalized intersections through the decision-making of autonomous vehicles, and autonomous vehicles learn policies through reinforcement learning based on Markov decision-making.

This technology also does not control lane changes of the autonomous vehicle, and performs platooning only through acceleration control, and the technology uses a fixed value for the target speed of the autonomous vehicle during the training process.

DISCLOSURE

Technical Issues

In order to solve the problems of the prior art described above, the present invention seeks to propose a traffic control method and apparatus using an autonomous vehicle based on adaptive reward that can achieve low traffic density through an adaptive target speed.

Technical Solution

In order to achieve the above object, according to an embodiment of the present invention, a traffic control apparatus for an autonomous vehicle based on adaptive reward comprises an information observation unit that collects observation information from a sensing module of an autonomous vehicle or a roadside unit (RSU); a policy execution unit that makes a decision regarding an action including adjusting acceleration and changing lanes of the autonomous vehicle based on the observation information and policy; and a reward determination unit that determines reward according to observation information at a next timestep according to the decision made, wherein reward in the reward determination unit includes penalty in an event of an accident and reward when driving, wherein the reward when driving includes an adaptive target speed reward term, a successful lane change reward term, and a safety distance compliance reward term that are adaptively determined according to road traffic.

The observation information may include at least one of a relative distance vector for each lane between front and rear vehicles and the autonomous vehicle, a relative speed vector for each lane for front and rear vehicles, a persistence vector for each lane ahead within an observable range of the autonomous vehicle, and an absolute speed of the autonomous vehicle.

The adaptive target speed reward term may obtain maximum reward when approaching a target speed, which changes at every timestep based on the speed of a front vehicle of an autonomous vehicle, and obtain penalty when driving at a speed exceeding a speed limit.

The target speed may be determined as a maximum value among speeds of vehicles ahead within an observable range of the autonomous vehicle.

The safety distance compliance reward term may include a reward term for maintaining a safety distance of the autonomous vehicle itself with respect to a front vehicle in the same lane and a safety distance reward term with respect to a rear vehicle in the same lane.

Training of the policy may be performed by the autonomous vehicle itself or by a central server connected to multiple autonomous vehicles through a network.

When the autonomous vehicle performs training of the policy on its own, the apparatus may further comprise a policy training unit that updates a policy according to experience information including the collected observation information, current action information according to the observation information, reward information according to the current action information, and observation information at a next timestep after the current action executed, and learns a policy by determining whether an accident has occurred and whether the number of training times is met.

When the central server performs training of the policy, the apparatus may further comprise a policy communication unit that transmits experience information including the collected observation information, current action information according to the observation information, reward information according to the current action information, and observation information at a next timestep after the current action executed to the central server, and receives a policy learned using experience information received from the multiple autonomous vehicles.

According to another aspect of the present invention, a traffic control apparatus for an autonomous vehicle based on adaptive reward comprises a processor; and a memory connected to the processor, wherein the memory includes program instructions that performs operations, when executed by the processor, comprising collecting observation information from a sensing module of an autonomous vehicle or a roadside unit (RSU), making a decision regarding an action including adjusting acceleration and changing lanes of the autonomous vehicle based on the observation information and policy, determining reward according to observation information at a next timestep according to the decision made, wherein the reward includes penalty in an event of an accident and reward when driving, wherein the reward when driving includes an adaptive target speed reward term, a successful lane change reward term, and a safety distance compliance reward term that are adaptively determined according to road traffic.

According to another aspect of the present invention, a method in an apparatus including a processor and a memory for performing traffic control for an autonomous vehicle based on adaptive reward comprises collecting observation information from a sensing module of an autonomous vehicle or a roadside unit (RSU), making a decision regarding an action including adjusting acceleration and changing lanes of the autonomous vehicle based on the observation information and policy, determining reward according to observation information at a next timestep according to the decision made, wherein reward includes penalty in an event of an accident and reward when driving, wherein the reward when driving includes an adaptive target speed reward term, a successful lane change reward term, and a safety distance compliance reward term that are adaptively determined according to road traffic.

Advantageous Effects

According to the present invention, there is an advantage in achieving low traffic density in a road environment through adaptive target speed.

BRIEF DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
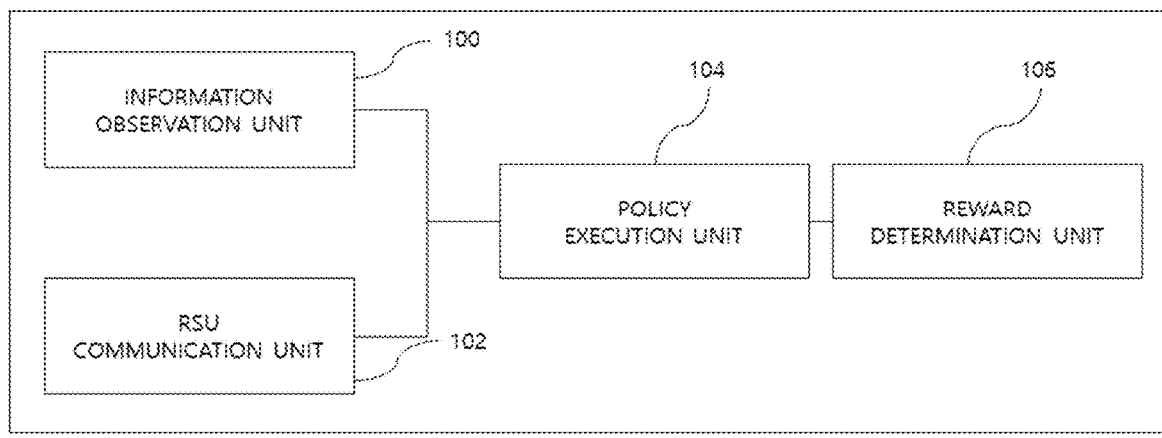
FIG. 1 is a diagram showing the configuration of a traffic control apparatus for an autonomous vehicle according to this embodiment.

Since the present invention can make various changes and have various embodiments, specific embodiments will be illustrated in the drawings and described in detail in the detailed description. However, this is not intended to limit the present invention to specific embodiments, and should be understood to include all changes, equivalents, and substitutes included in the spirit and technical scope of the present invention.

The terms used herein are only used to describe specific embodiments and are not intended to limit the invention. Singular expressions include plural expressions unless the context clearly dictates otherwise. In this specification, terms such as "comprise" or "have" are intended to indicate the presence of features, numbers, steps, operations, components, parts, or combinations thereof described in the specification, but are not intended to exclude in advance the possibility of the existence or addition of one or more other features, numbers, steps, operations, components, parts, or combinations thereof.

In addition, the components of the embodiments described with reference to each drawing are not limited to the corresponding embodiments, and may be implemented to be included in other embodiments within the scope of maintaining the technical spirit of the present invention, and a plurality of embodiments may be re-implemented as a single integrated embodiment even if separate descriptions are omitted.

In addition, when describing with reference to the accompanying drawings, identical or related reference numerals will be assigned to identical components regardless of the reference numerals, and overlapping descriptions thereof will be omitted. In describing the present invention, if it is determined that a detailed description of related known technologies may unnecessarily obscure the gist of the present invention, the detailed description will be omitted.

This embodiment proposes a system for training and performing driving policy (hereinafter referred to as policy) of autonomous vehicles, and can be applied regardless of single and multiple autonomous driving environments.

Here, policy can be defined as a policy model or policy network that makes decisions (action decisions) for driving autonomous vehicles.

In a single autonomous driving environment, the purpose is to control the autonomous vehicle itself, and in a multi-autonomous driving environment, the goal is traffic control through the control of multiple autonomous vehicles. At this time, policy training is performed through deep reinforcement learning, and includes the design of a partially observable Markov decision-making process.

The decision-making of autonomous vehicles can involve actions such as adjusting acceleration and changing lanes.

In this embodiment, the observation information used for decision-making is not limited to a specific road structure and can be comprehensively applied to a general driving environment.

The policy according to this embodiment considers avoiding physical accidents as its primary objective. The second purpose of the policy is to maximize the reward derived based on driving information of adjacent vehicles, and it is considered when no accident occurs.

According to a preferred embodiment of the present invention, the autonomous vehicle adaptively determines the target speed according to the driving speed of adjacent vehicles rather than a fixed value, and learns a policy to reach the target speed. Adaptive target speed provides autonomous vehicles with a goal within the currently achievable range, which enables them to learn flexible decision-making according to the surrounding road environment.

FIG. 1 is a diagram showing the configuration of a traffic control apparatus for an autonomous vehicle according to this embodiment.

As shown in FIG. 1, the autonomous vehicle according to this embodiment may include an information observation unit 100, a roadside unit (RSU) communication unit 102, a policy execution unit 104, and a reward determination unit 106.

The configuration in FIG. 1 may be configured inside an autonomous vehicle, but is not necessarily limited thereto.

The information observation unit 100 collects observation information $o_t^i$ for decision-making (acceleration determination, lane change) of the autonomous vehicle, and it can be obtained through communication with the autonomous vehicle's own sensing module or roadside unit (RSU).

Figure 2:
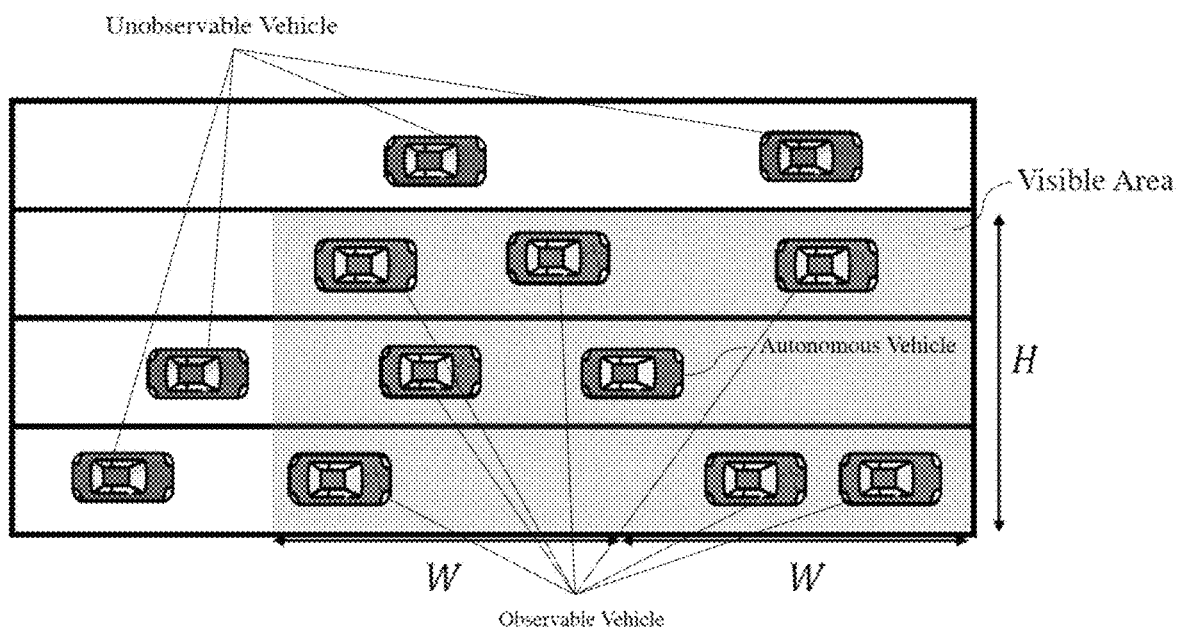
FIG. 2 is a diagram illustrating an example of an observable range that serves as a standard for decision-making of an autonomous vehicle according to this embodiment.

FIG. 2 is a diagram illustrating a road environment according to this embodiment.

Referring to FIG. 2, observation information is defined as front/rear W, total 2W distance, and information within H lanes based on the current location of the autonomous vehicle, and the following information is considered.

$$o_t^i = \left[\Delta p_t^{i^T}, \Delta v_t^{i^T}, \rho_t^{i^T}, \zeta_t^{i^T}, v_{t,i}\right]^T, \quad \text{[Equation 1]}$$

Here, $\Delta p_t^i = [\Delta p_{t,l_1}^i, \ldots, \Delta p_{t,l_H}^i, \Delta p_{t,f_1}^i, \ldots, \Delta p_{t,f_H}^i]^T$ represents the relative position of autonomous vehicle i and the front and rear vehicles, and is defined as the relative distance vector for each lane of the front and rear vehicles.

$\Delta v_t^i$ is the relative speed vector for each lane for the front and rear vehicles.

$\rho_t^i$ represents the degree of traffic congestion in proportion to the number of vehicles ahead observed as the vehicle density for each lane ahead.

$\zeta_t^i$ is observation information indicating whether the number of lanes on the road is expanded/reduced within the observable range of the autonomous vehicle, and is a persistence vector for each lane ahead.

$v_{t,i}$ is the absolute speed of the autonomous vehicle.

Figure 3:
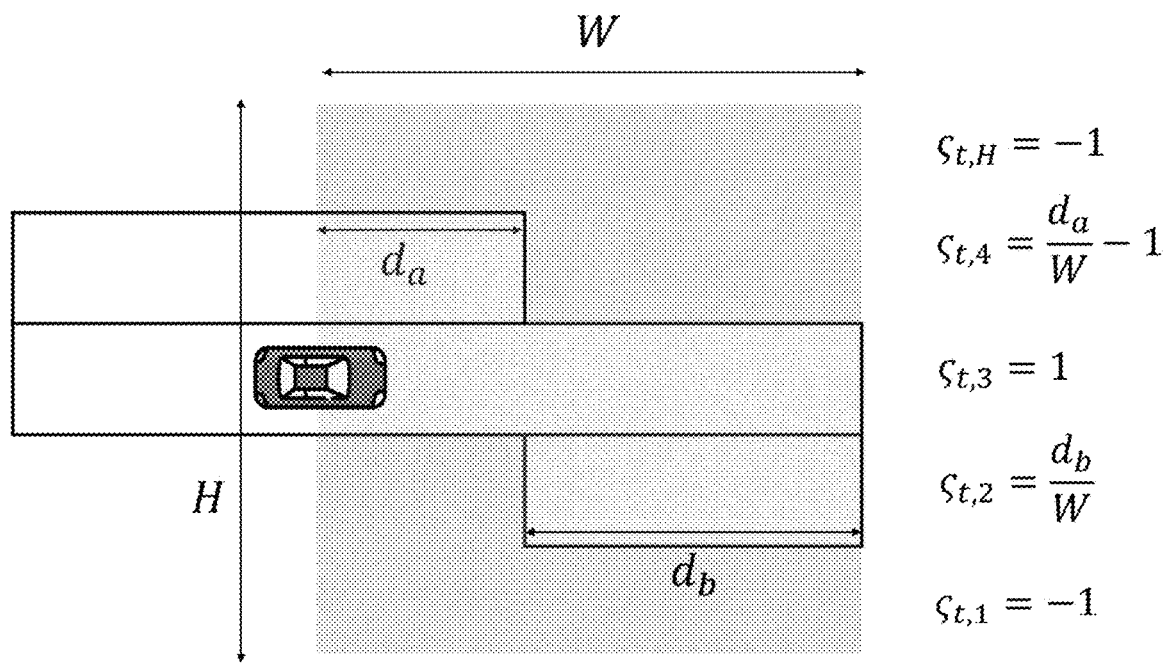
FIG. 3 is a diagram for explaining the persistence vector for each lane according to this embodiment.

FIG. 3 is a diagram for explaining the persistence vector for each lane according to this embodiment.

Referring to FIG. 3, the lane persistence observation information is information for determining whether the lanes are decreased/increased, and if the lane does not continue, it can be defined as $-1$ ($\zeta_{t,H}=-1$), and if the lane continues, it can be defined as $1$ ($\zeta_{t,2}=1$), and if the lane disappears after continuing for a certain distance, it can be defined as $$\zeta_{t,4} = \frac{d_a}{W} - 1.$$

Additionally, when the lanes are not connected but are connected after a certain distance, it can be defined as $$\zeta_{t,2} = \frac{d_b}{W}$$

The RSU communication unit 102 allows the autonomous vehicle to obtain information about the target vehicle through communication with the RSU when the vehicle cannot be sensed through its own sensing module. At this time, information exchange between autonomous vehicles and the RSU is done through V2I (Vehicle to Infrastructure).

Additionally, the RSU can communicate with an adjacent RSU to obtain or transmit information about the target vehicle. Communication between RSUs is done through I2I (Infrastructure to Infrastructure).

The policy according to this embodiment prioritizes the avoidance of physical accidents and aims to maximize driving reward if no accident occurs.

The policy execution unit 104 makes actual driving decisions regarding actions including acceleration control and lane change of the autonomous vehicle based on the observation information and policy obtained through the information observation unit 100 and the RSU communication unit 102.

The above-mentioned observation information may be information including at least some of the state information about the surrounding environment, and if all information about the surrounding environment can be collected, the observation information may be used in the same sense as the state information.

In addition, training of policy for decision-making by the policy execution unit 104 can be performed by the autonomous vehicle itself (single autonomous vehicle environment) or by a central server connected to multiple autonomous vehicles through a network.

Training of policy will also be discussed in more detail below.

The reward determination unit 106 determines the reward according to the decision-making of the autonomous vehicle based on observation information $o_t^i$ or state information $s_t$ at the next timestep according to the action performed by the policy execution unit 104, and the reward $\mathcal{R}(s_t, a_t^i, s_{t+1})$ is defined as follows.

$$\mathcal{R}(s_t, a_t^i, s_{t+1}) = \begin{cases} \mathcal{R}_{crash}, & \text{accident} \\ \mathcal{R}_{driving}, & \text{otehrwise} \end{cases} \quad \text{[Equation 2]}$$

Here, $\mathcal{R}_{crash}$ refers to the penalty applied when an accident occurs. A driving reward $\mathcal{R}_{driving}$ is expressed as a linear sum considering the weights of the five reward terms $[\mathcal{R}_\lambda]_{\lambda \in \{1,2,3,4\}}$ and is defined as follows.

$$\mathcal{R}_{driving} = \eta_1 \mathcal{R}_1^{adapt} + \eta_2 \mathcal{R}_2 + \eta_3 \mathcal{R}_3 + \eta_4 \mathcal{R}_4 \quad \text{[Equation 3]}$$

The adaptive target speed reward term $\mathcal{R}_1^{adapt}$ obtains maximum reward when approaching the target speed $v_{adapt}^*$, which changes at every timestep based on the speed of the front vehicle of the autonomous vehicle, and obtains penalty when driving at a speed exceeding the speed limit $v_{limit}$.

In this embodiment, the adaptive target speed considers the maximum value among the observable relative speeds with the vehicle ahead as follows.

$$\mathcal{R}_1^{adapt} = \begin{cases} \dfrac{v_{t+1,i}}{v_{adapt}^*}, & v_{t+1,i} \leq v_{adapt}^* \\ \dfrac{v_{limit} - v_{t+1,i}}{v_{limit} - v_{adapt}^*}, & v_{t+1,i} > v_{adapt}^* \end{cases} \quad \text{[Equation 4]}$$

$$v_{adapt}^* = \min(v_{min}^*, \max(\Delta v^T, v_{max}^*))$$

Here, $\Delta v^T$: front vehicle speed vector, $v_{max}^*$: maximum target speed $$\mathcal{R}_1^{adapt} = \begin{cases} \frac{v_{t+1,i}}{v_{adapt}^*}, & v_{t+1,i} \leq v_{adapt}^* \\ \frac{v_{limit} - v_{t+1,i}}{v_{limit} - v_{adapt}^*}, & v_{t+1,i} > v_{adapt}^* \end{cases}$$

$$v_{adapt}^* = \max(v_{min}^*, \min(\Delta v_{t,l,max} + v_{t,i}, v_{max}^*))$$

Here, $\Delta v_{t,l,max}$: maximum relative speed of front vehicle, $v_{max}^*$: maximum target speed, $v_{min}^*$: minimum target speed Here, $v_{t+1,i}$ is the speed of the agent (autonomous vehicle) at the next timestep point.

Figure 4:
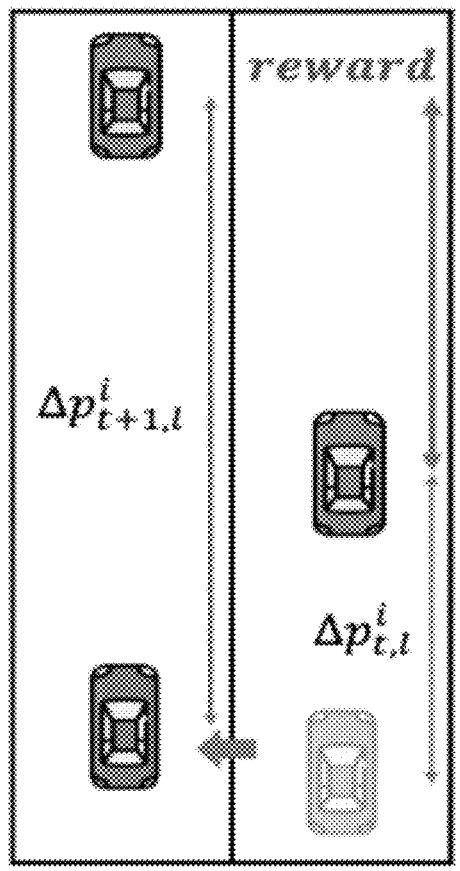
FIG. 4 is a diagram for explaining a successful lane change reward term according to this embodiment.
Figure 4:
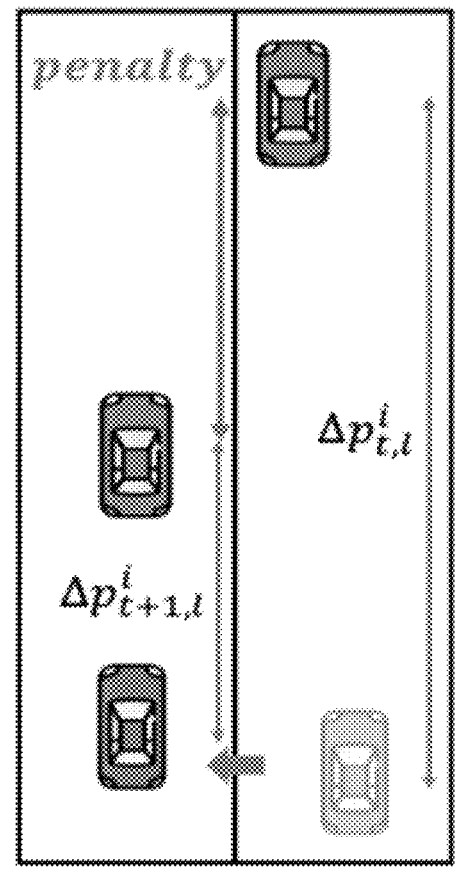

FIG. 4 is a diagram for explaining the lane change process according to this embodiment.

Referring to FIG. 4, the reward term $\mathcal{R}_2 = |a_{t,lc}^i|$ $(\Delta p_{t+1,l}^i - \Delta p_{t,l}^i)$ for a successful lane change is activated only when the autonomous vehicle performs a lane change, and the greater the relative distance gain due to the lane change, the higher the amount of reward is obtained.

$\Delta p_{t,l}^i$ represents the relative distance to the vehicle ahead in the same lane (before changing lanes), and $\Delta p_{t+1,l}^i$ represents the relative distance to the vehicle ahead in the same lane (after changing lanes).

The reward is determined by comparing the relative distance ($\Delta p_t^i$, $\Delta p_{t+1}^i$) to the vehicle ahead in the same lane before and after changing lanes.

The maximum reward is obtained when the relative distance gain ($\Delta p_{t+1}^i - \Delta p_t^i$) through lane change is maximized.

Safety distance compliance of autonomous vehicles is considered in $\mathcal{R}_3$ and $\mathcal{R}_4$. Among these, $\mathcal{R}_3$ is a reward term for maintaining the autonomous vehicle's own safety distance from the vehicle ahead in the same lane. If the relative distance between the autonomous vehicle and the vehicle ahead in the same lane is less than the safety distance $s_l^i$, a penalty is given and is defined as follows.

$$\mathcal{R}_3 = \min\left[0, 1 - \left(\frac{s_l^i}{\Delta p_{t+1,l}^i}\right)^2\right] \quad \text{[Equation 5]}$$

Here, $\Delta p_{t+1,l}^i$ is the relative distance to the vehicle ahead in the same lane, and $s_l^i$ is the safety distance of the autonomous vehicle to the vehicle ahead.

The safety distance compliance applies regardless of whether or not to change lanes, and a penalty is imposed for non-compliance with the safety distance ($\Delta p_{t+1,l}^i < s_l^i$).

The safe distance reward term $\mathcal{R}_4$ for the vehicle behind in the same lane is activated only when the autonomous vehicle performs a lane change. Through this reward term, the autonomous vehicle can be reinforced to perform lane changes without violating the safety distance $s_f^i$ from the vehicle behind, and $\mathcal{R}_4$ is defined as follows.

$$\mathcal{R}_4 = |a_{t,lc}^i|\min\left[0, 1 - \left(\frac{s_f^i}{\Delta p_{t+1,f}^i}\right)^2\right] \quad \text{[Equation 6]}$$

Here, $\Delta p_{t+1,f}^i$ is the relative distance to the vehicle behind in the same lane, and $s_f^i$ is the safety distance to the vehicle behind.

A penalty will be imposed if the safety distance of a vehicle behind in the same lane is violated ($\Delta p_{t+1,f}^i < s_f^i$).

As described above, in a single autonomous driving environment, policy training can be performed within the autonomous vehicle itself, and in a multi-autonomous driving environment, it can be performed through communication with a central server.

Figure 5:
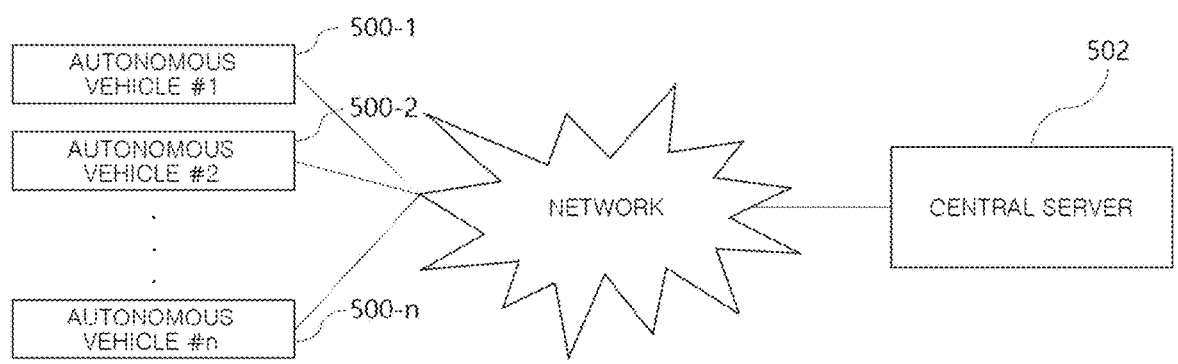
FIG. 5 is a diagram showing the configuration of a traffic control system for autonomous vehicles in a multi-autonomous driving environment according to this embodiment.
Figure 6:
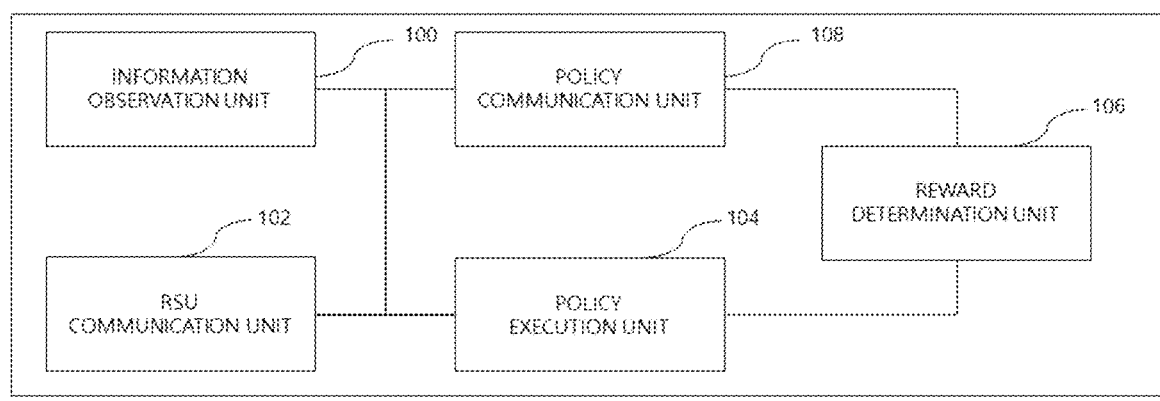
FIG. 6 is a diagram showing the configuration of an autonomous vehicle in a multi-autonomous driving environment.
Figure 7:
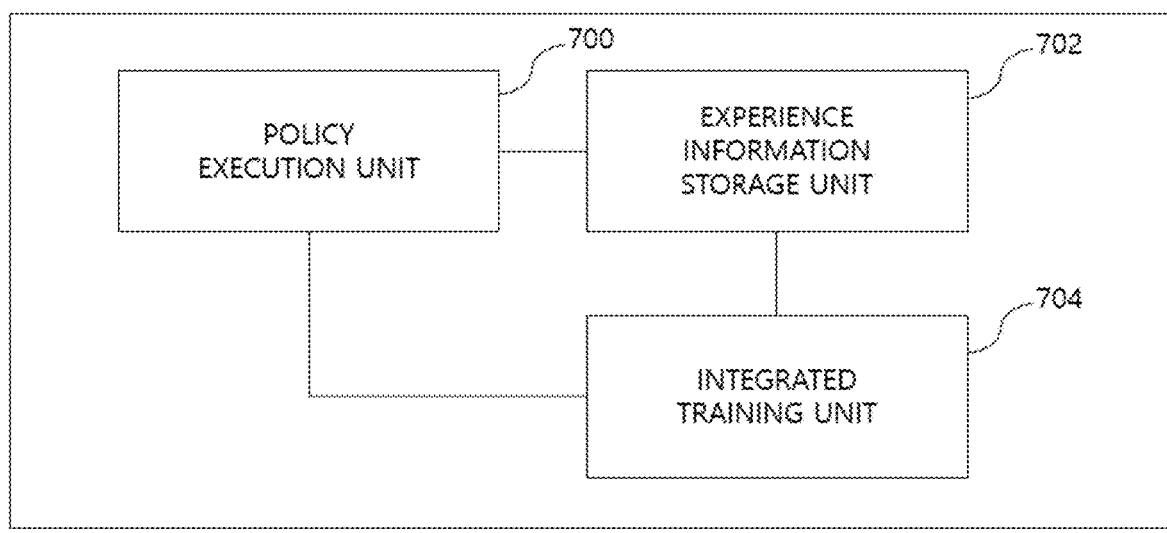
FIG. 7 is a diagram showing the configuration of a central server in a multi-autonomous driving environment.

FIG. 5 is a diagram showing the configuration of a traffic control system for an autonomous vehicle in a multi-autonomous driving environment according to this embodiment, FIG. 6 is a diagram showing the configuration of an autonomous vehicle in a multi-autonomous driving environment, and FIG. 7 is a diagram showing the configuration of a central server in a multi-autonomous driving environment.

As shown in FIG. 5, a plurality of autonomous driving devices 500 are connected to the central server 502 through a network.

Here, the network may include wired or wireless Internet and mobile communication networks.

As shown in FIG. 6, the autonomous driving device 500 according to this embodiment may include a policy communication unit 108 as well as the information observation unit 100, the RSU communication unit 102, the policy execution unit 104, and the reward determination unit 106 of FIG. 1.

In addition, the central server 502 is connected to multiple autonomous driving devices 500 through a network and may include a policy communication unit 700, an experience information storage unit 702, and an integrated training unit 704.

As described above, in a multi-autonomous driving environment, the central server 502 is connected to a plurality of autonomous vehicles 500 through a network, and at this time, training of policy is performed in the integrated central server 502.

Specifically, the individual autonomous vehicle 500 transmits experience information to the central server 502 through the policy communication unit 108. Here, the experience information of the individual autonomous vehicle 500 may include current observation information, current action, reward, and observation information at the next timestep.

The central server 502 integrates individual experience information transmitted through the policy communication unit 700 in the experience information storage unit 702, and the integrated experience information can be used as base data for later policy training.

The integrated training unit 704 of the central server 502 updates the decision-making policy for each autonomous vehicle using experience information from multiple autonomous vehicles based on deep reinforcement learning.

This is not limited to a specific reinforcement learning algorithm and can be comprehensively applied to most algorithms based on deep reinforcement learning methodology. Training of the policy is repeated a predefined number of times, and the policy updated during the training process is transmitted to each autonomous vehicle 500 through the policy communication unit 700.

After receiving the updated policy, the autonomous vehicle 500 makes actual driving decisions in the policy execution unit 104 by inputting observation information obtained through the information observation unit 100 and the RSU communication unit 102.

At this time, interaction with the central server and policy communication unit is not considered in the decision-making stage of the autonomous vehicle. Since the learned policy according to this embodiment considers the adaptive target speed in the training stage, flexible decision-making is possible even in irregular road congestion.

Meanwhile, in a single-driving vehicle environment, the policy communication unit 108 as shown in FIG. 6 is not included, and policy training can be performed independently by providing a policy training unit.

Figure 8:
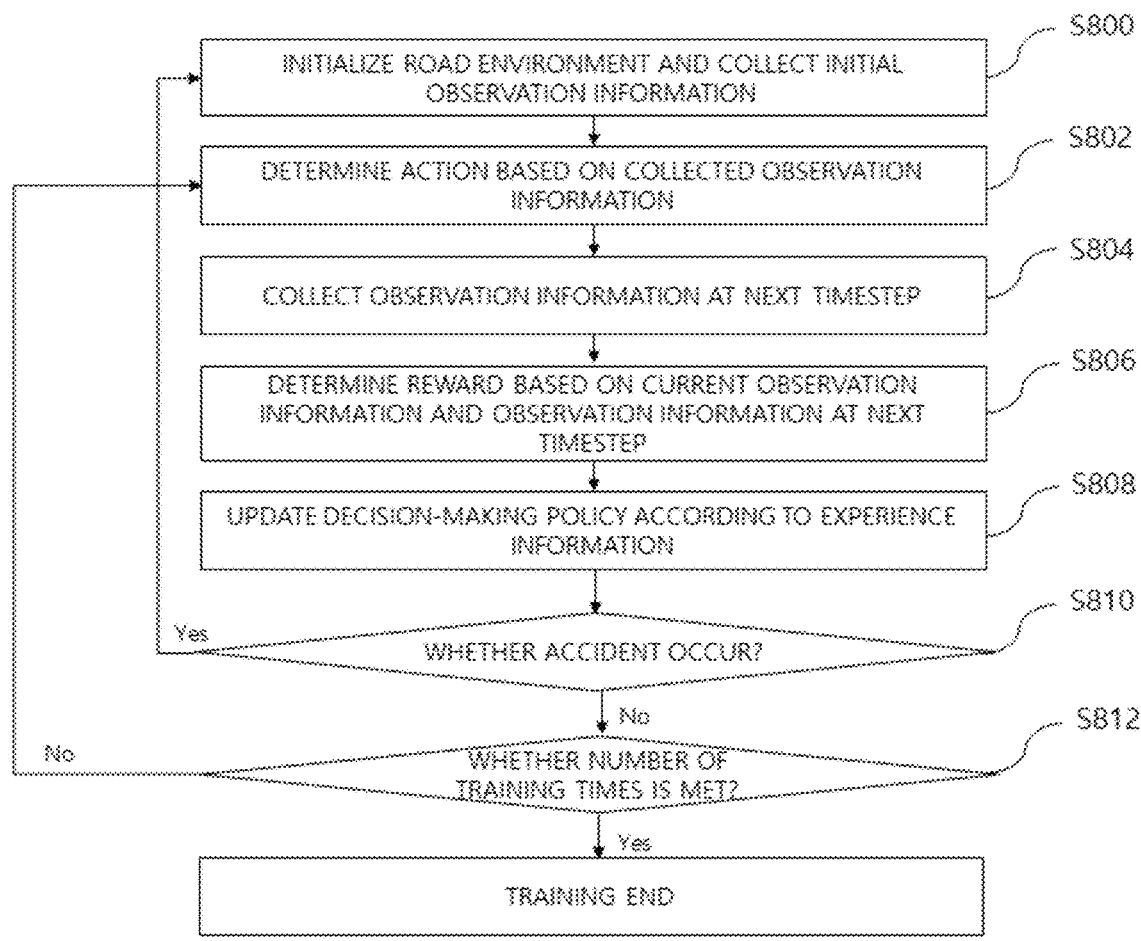
FIG. 8 is a diagram illustrating a policy training process in a single autonomous vehicle environment according to this embodiment.

FIG. 8 is a diagram illustrating a policy training process in a single autonomous vehicle environment according to this embodiment.

FIG. 8 shows the process of training a policy by the autonomous vehicle itself. Referring to FIG. 8, the device according to this embodiment initializes the road environment and collects initial observation information (step 800).

Here, the observation information may be information collected from a sensing module of an autonomous vehicle or a roadside unit (RSU).

Afterwards, an action is determined based on the collected observation information (step 802).

Action decisions according to this embodiment include adjusting the acceleration and determining the lane change direction of the autonomous vehicle.

State information at the next timestep is changed by the action determined in step 802, and observation information at the next timestep is collected accordingly (step 804).

The reward is determined based on the observation information in steps 802 and 804, action information according to the observation information, and observation information at the next timestep (step 806), and the decision-making policy is updated according to the experience information including the determined reward (step 808).

The device according to this embodiment determines whether an accident occurs according to the updated policy (step 810), and if not, determines whether the number of training times is met (step 812) and ends training.

Figure 9:
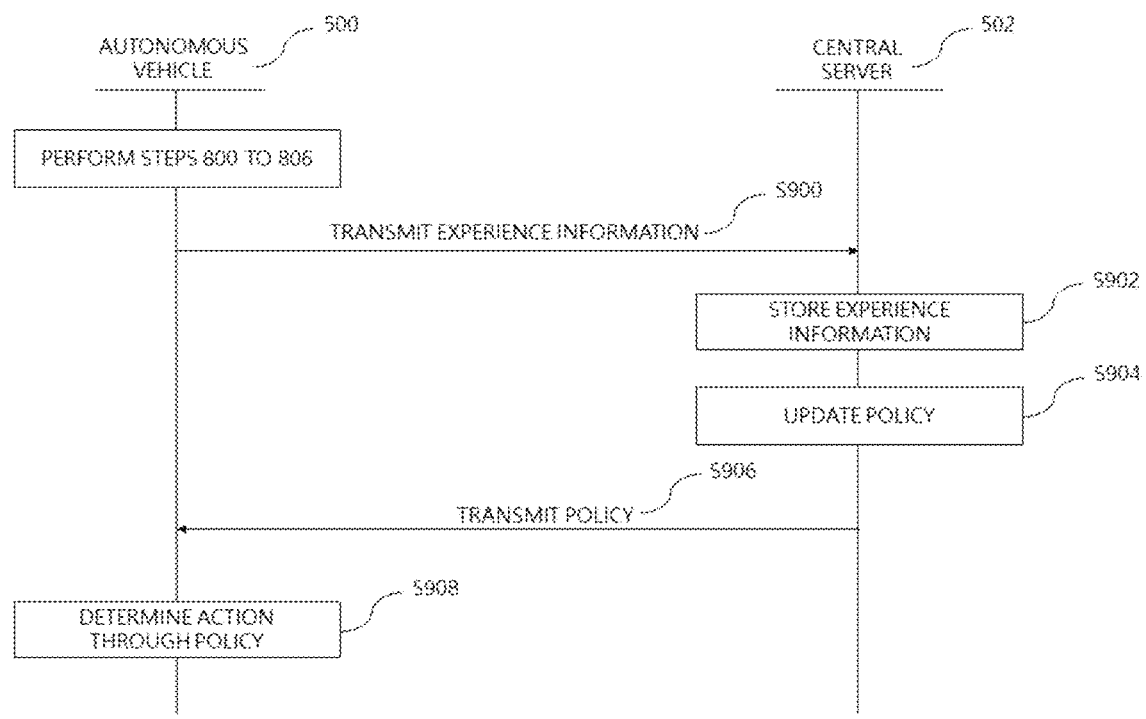
FIG. 9 is a flowchart showing the policy training process in a multi-autonomous driving environment according to this embodiment.

FIG. 9 is a flowchart showing the policy training process in a multi-autonomous driving environment according to this embodiment.

FIG. 9 is a diagram showing the process in which each autonomous vehicle collects observation information using an initial policy, determines actions and rewards, and then updates the policy at a central server connected to each autonomous vehicle through a network.

Referring to FIG. 9, after performing steps 800 to 806 in FIG. 8, the experience information is transmitted to the central server 502 through the policy communication unit 108 (step 900).

Here, the experience information may include observation information from each autonomous vehicle, action information according to the observation information, reward information according to the observation and action information, and observation information at the next timestep after the action.

The central server 502 stores the experience information (step 902), samples some of it, and updates the policy for driving the autonomous vehicle (step 904).

The update of the policy can be performed repeatedly until the preset number of training times is met.

The central server 502 transmits the updated policy to the autonomous vehicles (step 906), and each autonomous vehicle performs a decision-making process through the updated policy (step 908).

Figure 10:
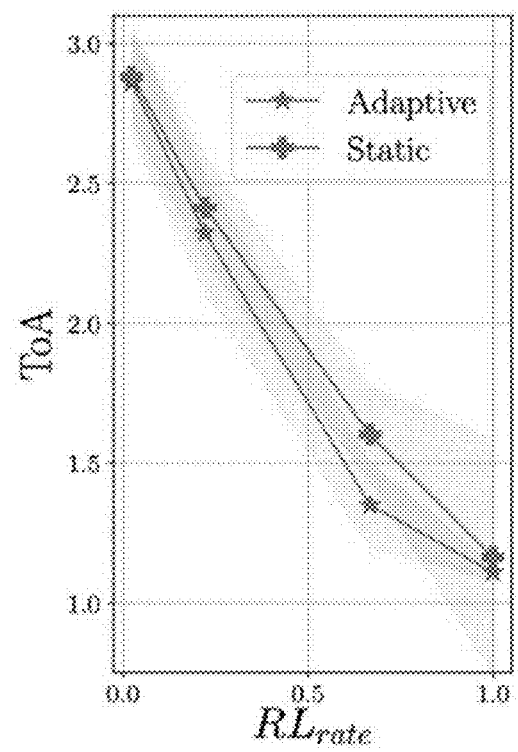
FIG. 10 is a graph comparing the traffic density in the section where a bottleneck occurs when the policy with a fixed target speed in the training process and the policy considering the adaptive target speed according to this embodiment are applied to a road including a lane reduction zone.
Figure 10:
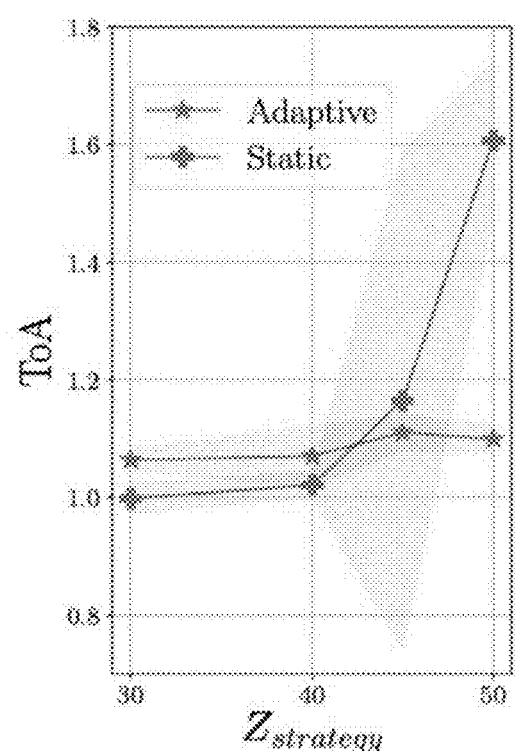

FIG. 10 is a graph comparing the traffic density in the section where a bottleneck occurs when the policy with a fixed target speed in the training process and the policy considering the adaptive target speed according to this embodiment are applied to a road including a lane reduction zone.

Traffic density is proportional to the number of vehicles staying in the bottleneck section, so it represents the degree of congestion of the entire system.

On the horizontal axis of the graph, $RL_{rate}$ means the ratio of autonomous vehicles on the road, and $Z_{strategy}$ means the number of vehicles when there are only autonomous vehicles on the road.

ToA, the vertical axis of the graph, represents the traffic density when considering the worst congestion when each policy is executed.

Through the graph, it can be seen that the traffic density of the policy considering the adaptive target speed according to this embodiment shows lower values in most measurements than the comparison target (Static). This means that the traffic density of the invented method, that is, the degree of congestion, is small.

The above-described traffic control method with autonomous vehicle based on adaptive reward can also be implemented in the form of a recording medium containing instructions executable by a computer, such as an application or program module executed by a computer. Computer-readable medium can be any available medium that can be accessed by a computer and includes both volatile and non-volatile medium, removable and non-removable medium. Additionally, computer-readable medium may include computer storage medium. The computer storage medium includes both volatile and non-volatile, removable and non-removable medium implemented in any method or technology for storage of information such as computer-readable instructions, data structures, program modules, or other data.

The above-described traffic control method with autonomous vehicle based on adaptive reward may be executed by an application installed by default on the terminal (this may include programs included in the platform or operating system installed by default on the terminal), and may also be executed by an application (i.e., program) installed directly on the master terminal by a user through an application providing server such as an application store server, or a web server related to the application or the service. In this sense, the above-described traffic control method with autonomous vehicle based on adaptive reward can be implemented as an application (i.e., program) installed by default in the terminal or directly installed by the user and recorded on a computer-readable recording medium.

The above-described embodiments of the present invention have been disclosed for illustrative purposes, and those skilled in the art will be able to make various modifications, changes, and additions within the spirit and scope of the present invention, and such modifications, changes, and additions should be regarded as falling within the scope of the patent claims below.

The invention claimed is:

1. A traffic control apparatus for an autonomous vehicle based on adaptive reward comprising:
an information observation unit that continuously collects observation information from a sensing module of an autonomous vehicle or a roadside unit (RSU);
a policy execution unit that makes a decision on an action including adjusting acceleration and changing lanes of the autonomous vehicle based on the observation information and policy; and
a reward determination unit that determines a reward according to observation information at a next timestep according to the decision, wherein the reward in the reward determination unit includes a penalty in the event of an accident and a reward when driving, wherein the reward when driving includes an adaptive target speed reward term that is adaptively determined according to road traffic, a successful lane change reward term, and a safety distance compliance reward term, wherein the adaptive target speed reward term obtains maximum reward when approaching a target speed, which changes at every timestep based on a speed of a front vehicle of an autonomous vehicle, and obtains penalty when driving at a speed exceeding a speed limit, wherein the target speed is determined as a maximum value among speeds of vehicles ahead within an observable range of the autonomous vehicle, wherein the policy execution unit, in real time, updates the policy based on the determined reward and outputs control commands to cause the autonomous vehicle to execute a driving action based on the observation information and the updated policy.

2. The apparatus of claim 1, wherein the observation information includes at least one of a relative distance vector for each lane between front and rear vehicles and the autonomous vehicle, a relative speed vector for each lane for front and rear vehicles, a persistence vector for each lane ahead within an observable range of the autonomous vehicle, and an absolute speed of the autonomous vehicle.

3. The apparatus of claim 1, wherein the safety distance compliance reward term includes a reward term for maintaining a safety distance of the autonomous vehicle itself with respect to a front vehicle in the same lane and a safety distance reward term with respect to a rear vehicle in the same lane.

4. The apparatus of claim 1, wherein training of the policy is performed by the autonomous vehicle itself or by a central server connected to multiple autonomous vehicles through a network.

5. The apparatus of claim 4 further comprises,
when the autonomous vehicle performs training of the policy on its own,
a policy training unit that updates a policy according to experience information including the collected observation information, current action information according to the observation information, reward information according to the current action information, and observation information at a next timestep after the current action information, and learns a policy by determining whether an accident has occurred and whether the number of training times is met.

6. The apparatus of claim 4 further comprises,
when the central server performs training of the policy,
a policy communication unit that transmits experience information including the collected observation information, current action information according to the observation information, reward information according to the current action information, and observation information at a next timestep after the current action executed to the central server, and receives a policy learned using experience information received from the multiple autonomous vehicles.

7. A traffic control apparatus for an autonomous vehicle based on adaptive reward comprising:
a processor; and
a memory connected to the processor, wherein the memory includes program instructions that perform operations, when executed by the processor, comprising, continuously collecting observation information from a sensing module of an autonomous vehicle or a roadside unit (RSU), making a decision on an action including adjusting acceleration and changing lanes of the autonomous vehicle based on the observation information and policy, determining reward according to observation information at a next timestep according to the decision, updating, in real time, the policy based on the determined reward and outputting control commands to cause the autonomous vehicle to execute a driving action based on the observation information and the updated policy, wherein the reward includes a penalty in the event of an accident and a reward when driving, wherein the reward when driving includes an adaptive target speed reward term, a successful lane change reward term, and a safety distance compliance reward term that are adaptively determined according to road traffic, wherein the adaptive target speed reward term obtains maximum reward when approaching a target speed, which changes at every timestep based on a speed of a front vehicle of an autonomous vehicle, and obtains penalty when driving at a speed exceeding a speed limit, wherein the target speed is determined as a maximum value among speeds of vehicles ahead within an observable range of the autonomous vehicle.

8. A method in an apparatus including a processor and a memory for performing traffic control for an autonomous vehicle based on adaptive reward comprising:

continuously collecting observation information from a sensing module of an autonomous vehicle or a roadside unit (RSU);

making a decision on an action including adjusting acceleration and changing lanes of the autonomous vehicle based on the observation information and policy;

determining reward according to observation information at a next timestep according to the decision; and updating, in real time, the policy based on the determined reward and outputting control commands to cause the autonomous vehicle to execute a driving action based on the observation information and the updated policy, wherein the reward includes a penalty in the event of an accident and a reward when driving, wherein the reward when driving includes an adaptive target speed reward term, a successful lane change reward term, and a safety distance compliance reward term that are adaptively determined according to road traffic, wherein the adaptive target speed reward term obtains maximum reward when approaching a target speed, which changes at every timestep based on a speed of a front vehicle of an autonomous vehicle, and obtains penalty when driving at a speed exceeding a speed limit, wherein the target speed is determined as a maximum value among speeds of vehicles ahead within an observable range of the autonomous vehicle.

9. The method of claim 8, wherein the observation information includes at least one of a relative distance vector for each lane between front and rear vehicles and the autonomous vehicle, a relative speed vector for each lane for front and rear vehicles, a persistence vector for each lane ahead within an observable range of the autonomous vehicle, and an absolute speed of the autonomous vehicle.

* * * * *